United States Patent [19]
Simmons

[11] Patent Number: 5,936,953
[45] Date of Patent: Aug. 10, 1999

[54] MULTI-MODE, MULTI-CHANNEL COMMUNICATION BUS

[75] Inventor: Albert L. Simmons, Harbor City, Calif.

[73] Assignee: Raytheon Company, Lexington, Mass.

[21] Appl. No.: 08/993,642

[22] Filed: Dec. 18, 1997

[51] Int. Cl.$^6$ .............................. H04L 12/50; G06F 13/40
[52] U.S. Cl. .......................... 370/364; 395/306; 395/307; 370/257
[58] Field of Search .................................... 370/362, 364, 370/365, 241, 254, 257; 395/293, 306, 307, 308, 309, 886

[56] References Cited

U.S. PATENT DOCUMENTS

| | | | |
|---|---|---|---|
| 5,191,653 | 3/1993 | Banks | 395/293 |
| 5,483,518 | 1/1996 | Whetsel | 370/241 |
| 5,548,786 | 8/1996 | Amini | 395/307 |
| 5,627,976 | 5/1997 | McFarland | 395/306 |

*Primary Examiner*—Ajit Patel
*Assistant Examiner*—Ricardo M. Pizarro
*Attorney, Agent, or Firm*—Leonard A. Alkov; Glenn H. Lenzen, Jr.

[57] ABSTRACT

A dynamically reconfigurable, multi-mode, multi-channel communication bus. The bus may be dynamically reconfigured into a plurality fo segments, or slices, to provide a relatively wide unified bus, or smaller versions of the bus. This allows multiple bus masters to coexist at the same time that control the bus. The protocol is adaptive in that bus widths dynamically change to allow addition or removal of bus masters at any time. Bus acquisition delays caused by bus arbitration latency using a packetized protocol regime are drastically reduced or eliminated in some systems by using the present bus. The bus demonstrates relatively high efficiency.

5 Claims, 5 Drawing Sheets

MULTI-MODE, MULTI-CHANNEL COMMUNICATION BUS

BACKGROUND

The present invention relates generally to communication busses, and more particularly, to a multi-mode, multi-channel communication bus that is particularly well suited to provide communication between multiple application specific integrated circuits (ASICs).

All common commercial and military busses packetize large messages to control the amount of bus arbitration latency. Furthermore, conventional busses do not dynamically change the number of busses that are available to transfer data. Also, bus acquisition delays caused by bus arbitration latency in a packetized protocol regime is relatively high using conventional busses. Conventional busses do not allow multiple bus masters to coexist at the same time.

Therefore, it would be an advantage to have a communication bus that is dynamically reconfigurable to allow multiple bus masters to coexist at the same time and therefore improve bus acquisition delays. Accordingly, it is an objective of the present invention to provide for a multi-mode, multi-channel communication bus. It is a further objective of the present invention to provide for a multi-mode, multi-channel communication bus that provides for improved inter-ASIC communication.

SUMMARY OF THE INVENTION

To meet the above and other objectives, the present invention provides for a multi-mode, multi-channel communication bus that is dynamically reconfigurable. The multi-mode, multi-channel communication bus provides for dynamic reconfiguration of a larger bus width (64 bits wide, for example) into smaller versions of the original bus (32 bits wide, 16 bits wide, 8 bits wide, etc.), thus allowing multiple bus masters to coexist at the same time. The protocol is adaptive in that bus widths dynamically change to allow addition or removal of a bus master at any time. This means that the bus state is not required to transition into an idle state before reconfiguration can occur.

More specifically, the multi-mode, multi-channel communication bus permits communication between a plurality of nodes. The communication bus comprises a plurality of multiplexed busses coupled between each of the nodes that each have a bus width that is a predetermined portion of the communication bus, and whose combined bus width is equal to the bus width of the communication bus. A plurality of read/write lines, bus request lines, idle lines and bus grant lines are coupled between each of the nodes. In the present bus, one of the nodes comprises an arbiter that dynamically reconfigures the bus width of the communication bus to segment the communication bus into smaller independent slices and to allow multiple bus masters to coexist at the same time.

The multi-mode, multi-channel communication bus eliminates problems associated with the commercial and military busses by dynamically providing more busses to transfer data. The degree of fragmentation depends upon the instantaneous demand (number of multiple bus requests). In most cases, the segmenting of the larger bus into smaller independent slices eliminates latency. The multi-mode, multi-channel communication bus solves certain deficiencies of some common commercial and military bus standards, such as PCI and PI-Bus protocols, for example.

The primary advantage of the present invention is that bus acquisition delays caused by bus arbitration latency in a packetized protocol regime are drastically reduced or eliminated in some systems. As a result, the multi-mode, multi-channel communication bus demonstrates higher efficiency relative to contemporary standard busses.

The present invention is a bus that may be preferably used as an inter-ASIC communication path to overcome deficiencies found in conventional commercial busses, such as PCI and PI-Bus busses, for example. The present bus structure (using an adaptive protocol) may be employed with all systems that use common busses and distributed bus masters, particularly in a Common Integrated Processor architecture developed for an F-22 aircraft, for example. However, although the present invention was specifically developed to improve inter-ASIC communication, it is not limited to this application.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which.

DETAILED DESCRIPTION

Figure 1:
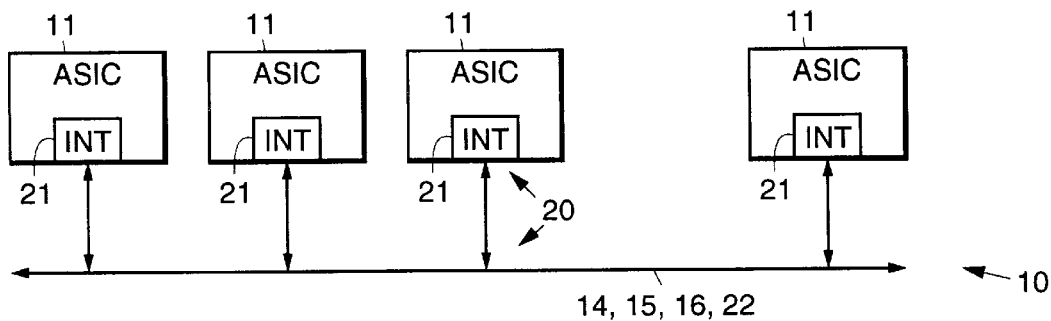
FIG. 1 illustrates a system employing a multi-mode, multi-channel communication bus in accordance with the principles of the present invention.

Referring to the drawing figures, FIG. 1 depicts an exemplary system 10 employing a multi-mode, multi-channel communication bus 20 in accordance with the principles of the present invention. The exemplary system 10 includes a plurality of application specific integrated circuits (ASICs) 11 or nodes 11 that communicate with each other by way of the multi-mode, multi-channel communication bus 20. In the system 10, each of the plurality of ASICs 11 may become a bus master 11 that controls or drives a single relatively wide (unified) address/data multiplexed (MMIC) bus 22 (FIG. 2) of the communication bus 20. Each of the plurality of ASICs 11 has a bus interface (INT) 21 that is part of the communication bus 20 that permits the ASIC 11 to become a bus master 11 and drive the communication bus 20.

Figure 2:
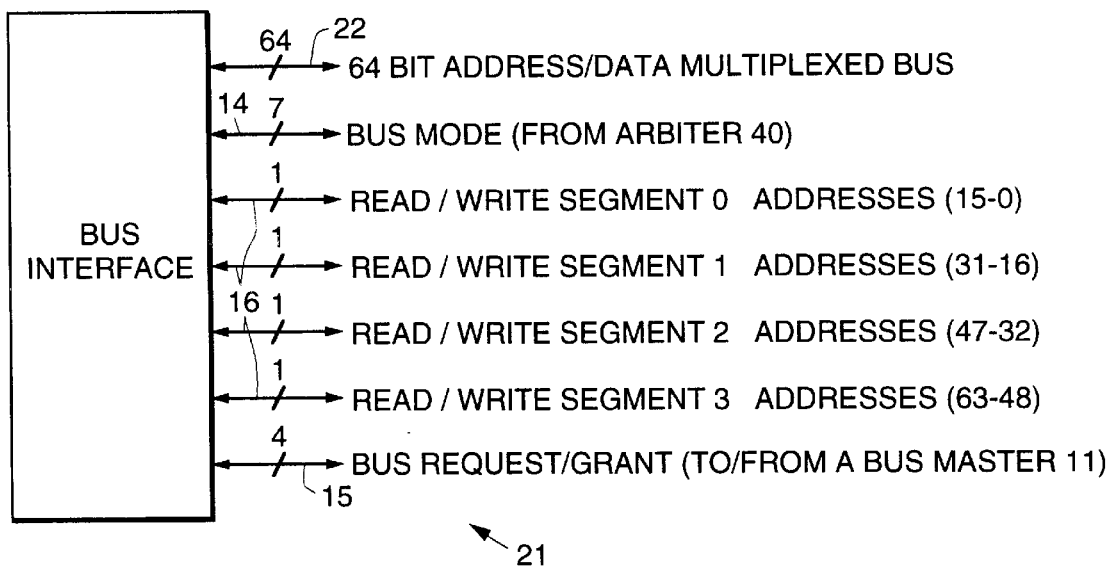
FIG. 2 shows a bus interface for an exemplary 64 bit wide implementation of a multi-mode, multi-channel communication bus of the present invention.

FIG. 2 illustrates the bus interface 21 for an exemplary 64-bit wide implementation of the multi-mode, multi-channel communication bus 20. The communication bus 20 was developed to provide communication between multiple ASICs 11 by way of the address/data multiplexed bus 22 (shown in FIG. 2 as 64 bits wide). Multi-mode, multi-channel communication is achieved by allowing selected ASICs 11 to act as bus masters 11 that independently use a portion(s) or segment(s) of the multiplexed bus 22. The portions or segments of the multiplexed bus 22 are designated in FIGS. 3–6 by numerals 22a, 22b, 22c and 22d, depending upon how many bus slices are formed. The multi-mode, multi-channel communication bus 20 is described herein with regard to its use with multiple ASICs 11. However, the present communication bus 20 is not limited to use with ASICs 11, and has general applicability to systems that use common busses and distributed bus masters 11, such as those used in military avionics systems, for example.

The multi-mode, multi-channel communication bus 20 is unique in that acquisition latency is reduced by permitting multiple bus masters 11 to exist at the same time. This is accomplished by reconfiguring the relatively wide multiplexed bus 22 (such as a 64-bit wide bus 22, for example) into several narrower busses 22 (such as two 32 bit wide busses 22a, 22b, or four 16 bit wide busses 22a, 22b, 22c, 22d, for example). The interface ports 21 of each ASIC 11 monitor bus arbitration control lines 14 coupled to an arbiter 40 (FIGS. 3–5) to determine which bus master 11 (ASIC 11) is to drive which segment(s) of the multiplexed (MMIC) bus 22. Bus request lines 15 are also coupled between the ASICs 11 along with read/write segment lines 16.

The multi-mode, multi-channel communication bus 20 permits reconfiguring the wide multiplexed bus 22 into several narrower independent busses 22a–d that provide for immediate handling of simultaneous unrelated bus transactions by multiple bus masters 11 (multiple ASICs 11). Segmentation or "split operation" of the wide unified multiplexed bus 22 occurs during an existing transaction, meaning that multiple bus masters 11 coexist. When only one bus master 11 requests the bus 20, a default mode is provided which is a dedicated 64-bit wide multiplexed bus 22 (comprising all four bus segments 22a–22d) working at its full bus bandwidth. Multiple bus masters 11 do not have to wait for a current transaction to end for reconfiguration (into smaller bus segments) to take place. The communication bus 20 thus provides for an adaptive protocol where the transfer protocol changes depending upon how many bus masters 11 request the multiplexed bus 22 at any particular time.

There are four primary configurations of the multi-mode, multi-channel communication bus 20, but the present invention is not limited to these specific configurations. The first is the single 64-bit wide multiplexed bus 22 controlled by one bus master 11. The second comprises two 32 bit wide multiplexed busses 22 (comprising bus segments 22a, 22b) controlled by two bus masters 11. The third comprises two 16 bit wide multiplexed busses 22 (bus segments 22a, 22b) and one 32 bit wide multiplexed bus 22 (bus segment 22c) controlled by three bus masters 11. The fourth comprises four 16 bit wide multiplexed busses 22 (bus segments 22a, 22b, 22c, 22d) controlled by four bus masters 11. The bus mode line 14 of the bus interface 21 shown in FIG. 2 is controlled such that a change in the state of the arbiter 40 indicates the presence of a grant or grants to multiple bus masters 11. Two specific examples are described with reference to FIGS. 4 and 5, which illustrate two of the configurations.

Figure 3:
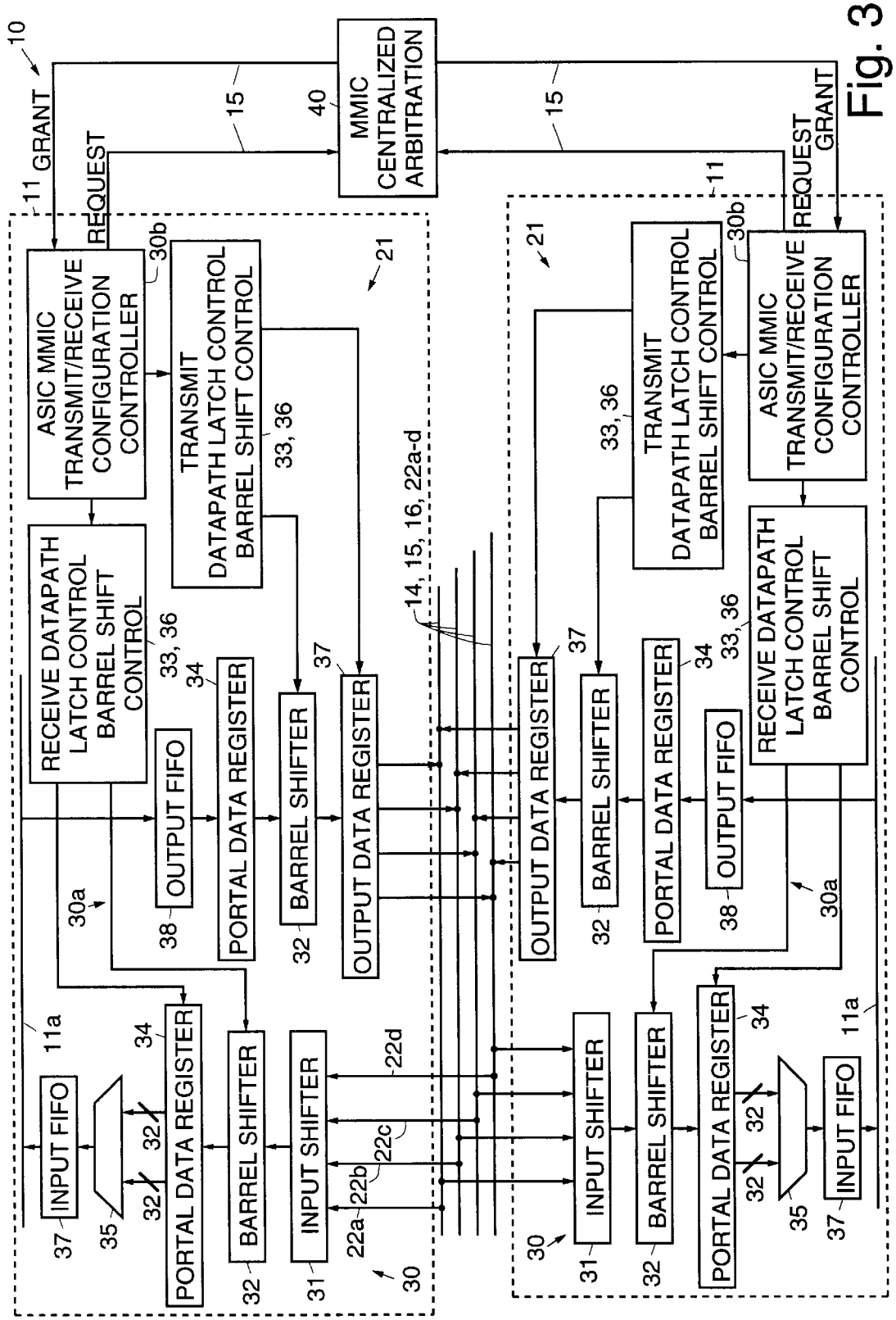
FIG. 3 is a detailed block diagram illustrating the bus interface for the system of FIG. 1.

FIG. 3 is a block diagram of an exemplary 4-bit four-slice multi-mode, multi-channel communication bus 20 illustrating details of the bus interface 21 shown in FIGS. 1 and 2. As is shown in FIG. 3, two nodes 11 or ASICs 11 are connected by way of the multi-mode, multi-channel communication bus 20. Each node 11 or ASIC 11 comprises a bus interface 21 containing an input port 30 and an output port 30a. The input and output ports 30, 30a are coupled to lines comprising the multiplexed bus 22 (shown as segments 22a, 22b, 22c, 22d) and the respective control lines 14, 15, 16 shown in FIG. 2.

The input port 30 of each node 11 includes an input register 31 coupled between the segments 22a, 22b, 22c, 22d of the multiplexed bus 22 and a barrel shift register 32. The barrel shift register 32 is controlled by a receive shift register controller 33. The barrel shift register 32 is coupled to a portal data register 34 comprising a plurality of shift registers 34. The plurality of shift registers 34 are coupled to a latch 35. The latch 35 is controlled by a receive latch controller 36. The latch 35 is coupled to a data register 37 comprising an input first-in, first-out (FIFO) 37 that is coupled to an internal bus 11a of the node 11 or ASIC 11. The receive shift register controller 33 and receive latch controller 36 are controlled by a transmit/receive configuration controller 30b which interfaces to an arbiter 40.

The output port 30a of each node 11 includes an output first-in, first-out (FIFO) 38 that is coupled to the internal bus 11a of the node 11 or ASIC 11. The output FIFO 38 is coupled by way of a portal data register 34 comprising a plurality of shift registers 34 to a barrel shift register 32. The barrel shift register 32 is controlled by a transmit shift register controller 33. The barrel shift register 32 is coupled by way of an output data register 38 to the communication bus 20. The output data register 38 is controlled by a transmit latch controller 36. The transmit shift register controller 33 and transmit latch controller 36 are also controlled by the transmit/receive configuration controller 30a which interfaces to the arbiter 40.

Figure 4:
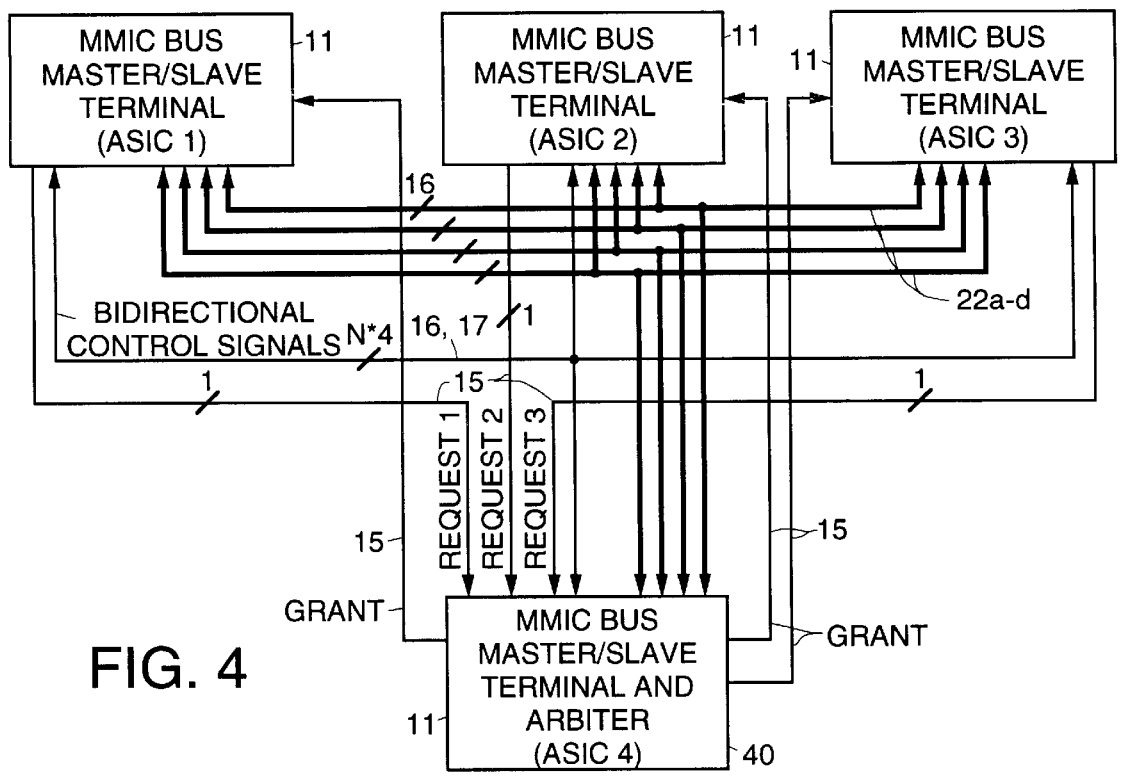
FIG. 4 illustrates an exemplary 64-bit four-slice multi-mode, multi-channel communication bus in accordance with the principles of the present invention.

FIG. 4 illustrates an exemplary 64-bit four-slice multi-mode, multi-channel communication bus 20. Four ASICs 11 are interconnected by way of the 64-bit four-slice multiplexed bus 22 comprising four 16-bit wide address/data multiplexed busses 22a, 22b, 22c, 22d or segments 22a, 22b, 22c, 22d. The ASICs 11 have bidirectional control lines 14, 15, 16, 17 coupled between them that include bus mode lines 14, bus request and grant lines 15, read/write A and B lines 16, and idle A and B lines 17. The bus request and grant lines 15 are connected between respective slave ASICs 11 and the master ASIC 11 that comprises the arbiter 40. The lowermost ASIC 11 includes the arbiter 40 in the embodiment shown in FIG. 4. Bus request and grant logic is provided in each of the respective ASICs 11 (in the arbiter 40) that process request and grant signals in a conventional manner.

Figure 5:
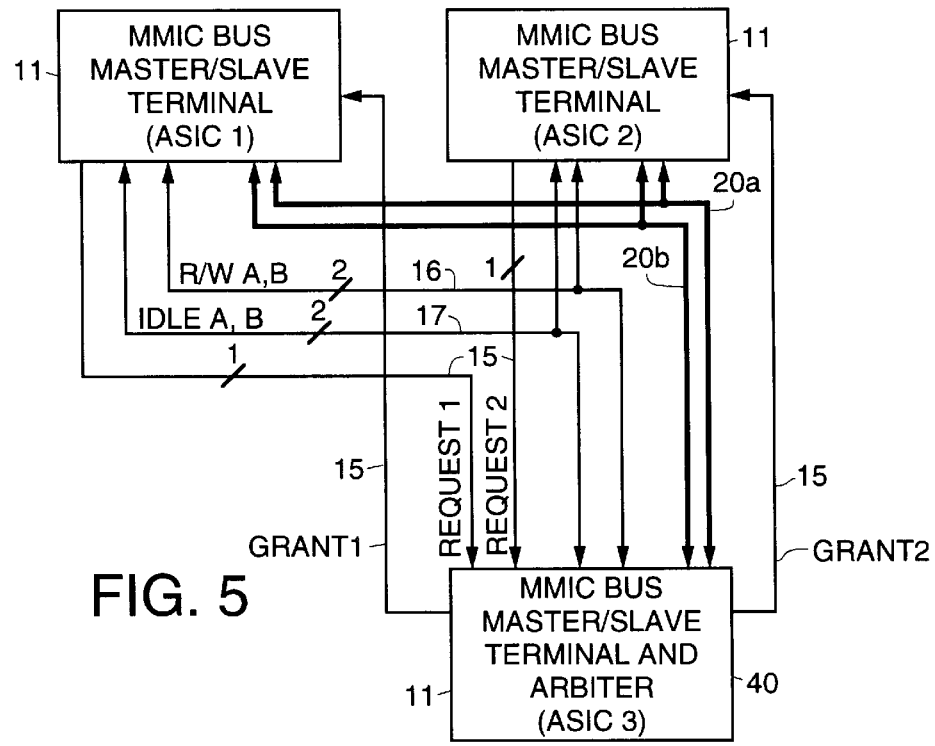
FIG. 5 illustrates an exemplary 32-bit two-slice multi-mode, multi-channel communication bus in accordance with the principles of the present invention.

FIG. 5 illustrates an exemplary 32-bit two-slice multi-mode, multi-channel communication bus 20. The 32-bit two-slice communication bus 20 comprises two 32-bit wide address/data multiplexed busses 22a, 22b. The ASICs 11 have bi-directional control lines 16, 17 coupled between them that include the read/write A and B lines 16 and the bus request lines 15. The bus request and grant lines 15 are connected between respective slave ASICs 11 and the master ASIC 11 that includes the arbiter 40. The lowermost ASIC 11 is the arbiter 40 in the exemplary embodiment shown in FIG. 5. Bus request and grant logic is provided in each of the respective ASICs 11 that process request and grant and grant signals in a conventional manner. The ASIC 11 that includes the arbiter 40 in the embodiment of FIG. 5 may be configured to implement a ring or a first-come, first-served request/grant scheme. The ASIC 11 that is the arbiter 40 monitors the status of the other ASICs 11 to properly allocate bus resources.

Figure 6:
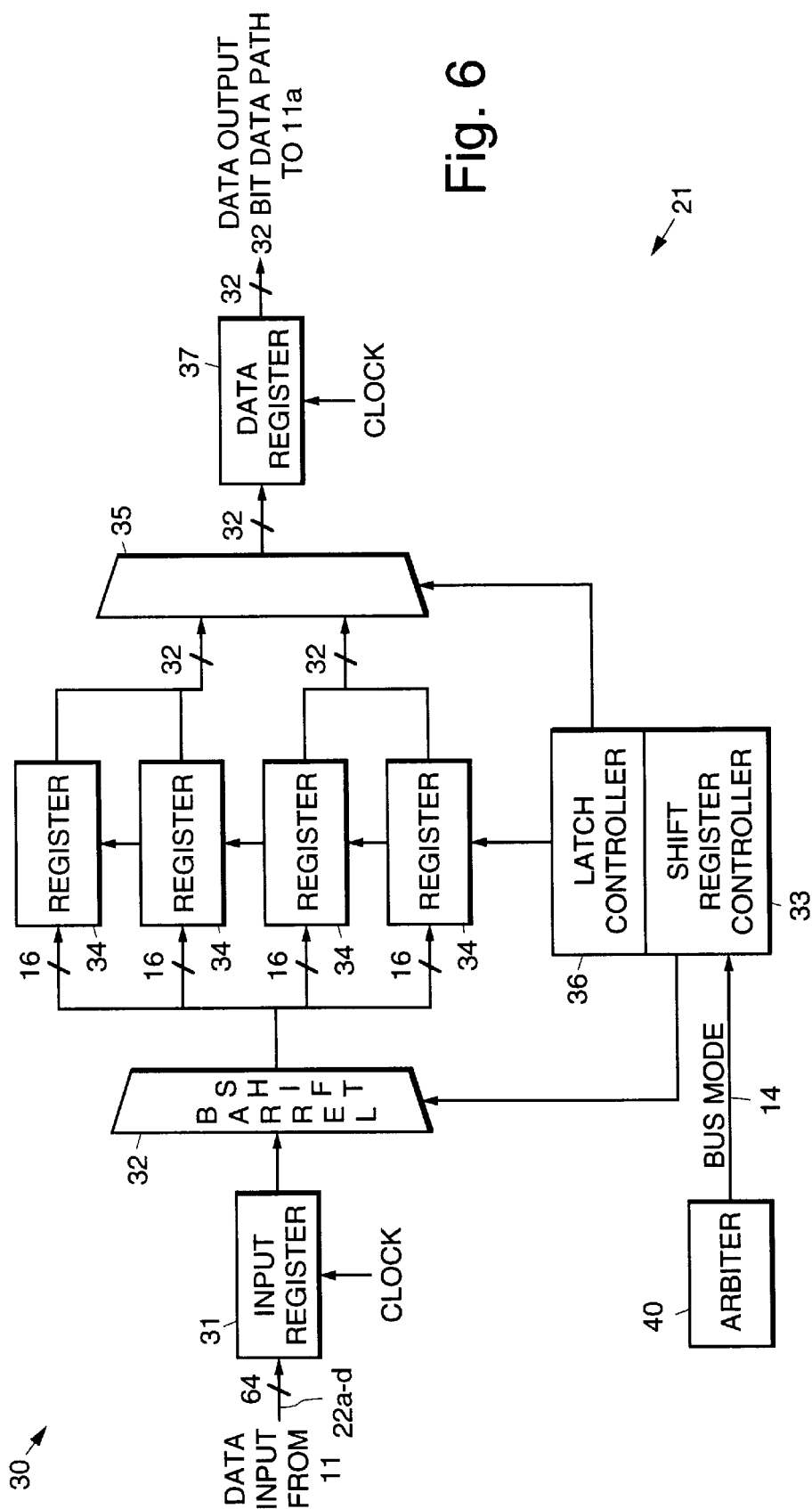
FIG. 6 is a block diagram of an input interface of a 64-bit input port of the multi-mode, multi-channel communication bus.

FIG. 6 is a block diagram of an exemplary 64 bit input port 30 of the bus interface 21 that implements the multi-mode, multi-channel communication bus 20. A reversed configuration of the 64 bit input port 30 functionally defines an output port 30a of the bus interface 21, and are shown in FIG. 3. The input port 30 comprises an input register 31 with a data input having a 64 bit wide data path. The input register 31 is coupled to a barrel shift register 32 that is controlled by a shift register controller 33. The barrel shift register 32 is coupled to a plurality of shift registers 34 that each have a 16 bit wide data path. The plurality of shift registers 34 are coupled to a latch 35. The plurality of shift registers 34 and the latch 35 are controlled by a latch controller 36. The latch 35 is coupled to a data register 37 comprising an data output having a 32 bit wide data path.

The present invention provides for specific architectural enhancements to MMIC master and slave interface designs. FIG. 2 depicts functional components of the bus 20 and that are used to temporarily ignore bus segments 22a–22d (control and data lines) that are not used for an immediate node 11 to node 11 transaction. Therefore, the following requirement is specific to the present invention. The masters 11 and slaves 11 must be able to conduct a transaction on a single bus slice at a minimum, or all bus slices at a maximum (FIGS. 2–4 show four bus slices of the implementation).

The number of slices used on the multiplexed bus 22 determines the peak instantaneous bandwidth of the transaction. For example, a bus transfer using one slice will only maintain a peak transfer rate one-quarter of the peak potential (in the examples of FIGS. 2–4). In the example implementations, the peak transfer width is 64 bits or four bus slices used simultaneously for a master 11 to slave 11 transaction. Therefore, it is a requirement is that the master 11 or slave 11 be able to initiate and complete a transaction using one (or N) slices of the multiplexed bus 22.

The next aspect of the master-slave interface 21 is that, since data will end up in a storage medium (i.e., register or latch), a shifter must exist to translate data transferred on any bus slice or slices, and reconstruct the data segments to form the original wide data word, (see FIG. 6). In the aforementioned examples, a data word may be split up into four 16-bit words if one bus segment is used for a particular transfer. Likewise, if two slices are used, the 32-bit data packets are combined to yield 64 bits of resultant data. In the case where the ASIC data busses 11a are 32 bits wide and a 64 bit multiplexed bus 22 is used, rate buffering is employed to accommodate the overrun of data. Therefore, the next requirement for a master-slave interface 21 is that master-slave partitions in an ASIC 11 use a shifting function (barrel shifter 32) to format wide data into smaller segments. Slave partitions use the shifting function to adjust incoming data so that the original data (with a wider data width) can be reconstructed from smaller components. The amount of shifting depends upon how many bus slices (segments 22a–22d) are used during the transfer.

Another important behavior for the multiplexed bus 22 during the arbitration grant phase is that the slice allocation used for an existing transfer may be reallocated in the middle of the current transaction. In this case, the arbiter 40 examines the existing bus slice allocation, and upon reception of the bus request, synchronously redefines the allocations to support simultaneous transfers. This dynamic reconfiguration during an existing bus transaction to allow multiple masters 11 prompts the following master-slave characteristic. Bus masters 11 and slaves 11 must be able to dynamically redefine the bus transaction in progress to free resources for another bus master 11. This implies a user-defined synchronism between bus arbitration and transaction timing. This is unique to the present ASIC implementation.

The function that oversees the data transfer width, or how many bus slices are used for a particular transaction, is determined by an arbitration function. A bus arbiter is not unique to a bus implementation. However the present arbiter 40 is unique because it must query a bus slave 11 to determine if it can accept data, determine what bus slice resources are available, supply enough information to both master 11 and slave 11 to indicate on which bus slices the transaction will occur, and monitor the transactions to determine when bus slice resources become available for use for a subsequent transaction. In order to accomplish the above requirements, the arbiter 40 keeps track of bus segments. This is unique, because standard arbiter function only involve keeping track of the utilization of the entire bus 22 and not individual bus slices (segments 22a–22d). Therefore, the features described above for the arbiter 40 define a MMIC-unique (or ASIC-unique) arbiter 40 that keeps track of which bus slices are used at any one time. Bus slices are awarded to an arbitration winner based upon the bandwidth required for a transaction and bus slice resources available at the time of arbitration.

At the physical layer of the MMIC protocol, each bus slice contains signal functional groups comprising a bus entity in itself. This means that each slice contains a data slice (16 bits in the aforementioned examples), data direction controls and a strobe. Also, if the bus 22 is to be throttled, then a signal equivalent to "transfer acknowledge" must exist to indicate to a master 11 that the addressed bus slave 11 can take the data transferred on the bus slices.

The following is a brief description of a typical transaction between master 11 and slave 11. The first phase of such a transaction is the arbitration phase. At this time, the arbiter 40 examines its record of the existing transactions on the bus 22. This knowledge is received be each master 11 requesting bus resources from the arbiter 40. The arbiter 40 grants resources and stores the current status of the bus 22. The arbiter 40 stores the current bus status so that it knows how to allocate bus resources for subsequent transaction requests from a different bus master 11.

The master 11 then grants bus slices to the master 11 and also notifies the slave 11 which of the bus slices will facilitate transmission of data. After the requisite handshaking between the arbiter 40, master 11 and slave 11 is complete, the transaction is started between the master 11 and slave 11. The arbitration/grant sequence may result in a reallocation of bus slices available for new and existing transactions. As discussed above, existing transactions need not be interrupted due to design considerations in the arbiter 40, master 11 and slave 11 ASIC partitions. After the transfer is complete, the existing bus master 11 controlling a particular number of bus slices notifies the arbiter 40 that the transaction is done, meaning that those bus resources can be allocated to another master 11.

Figure 7:
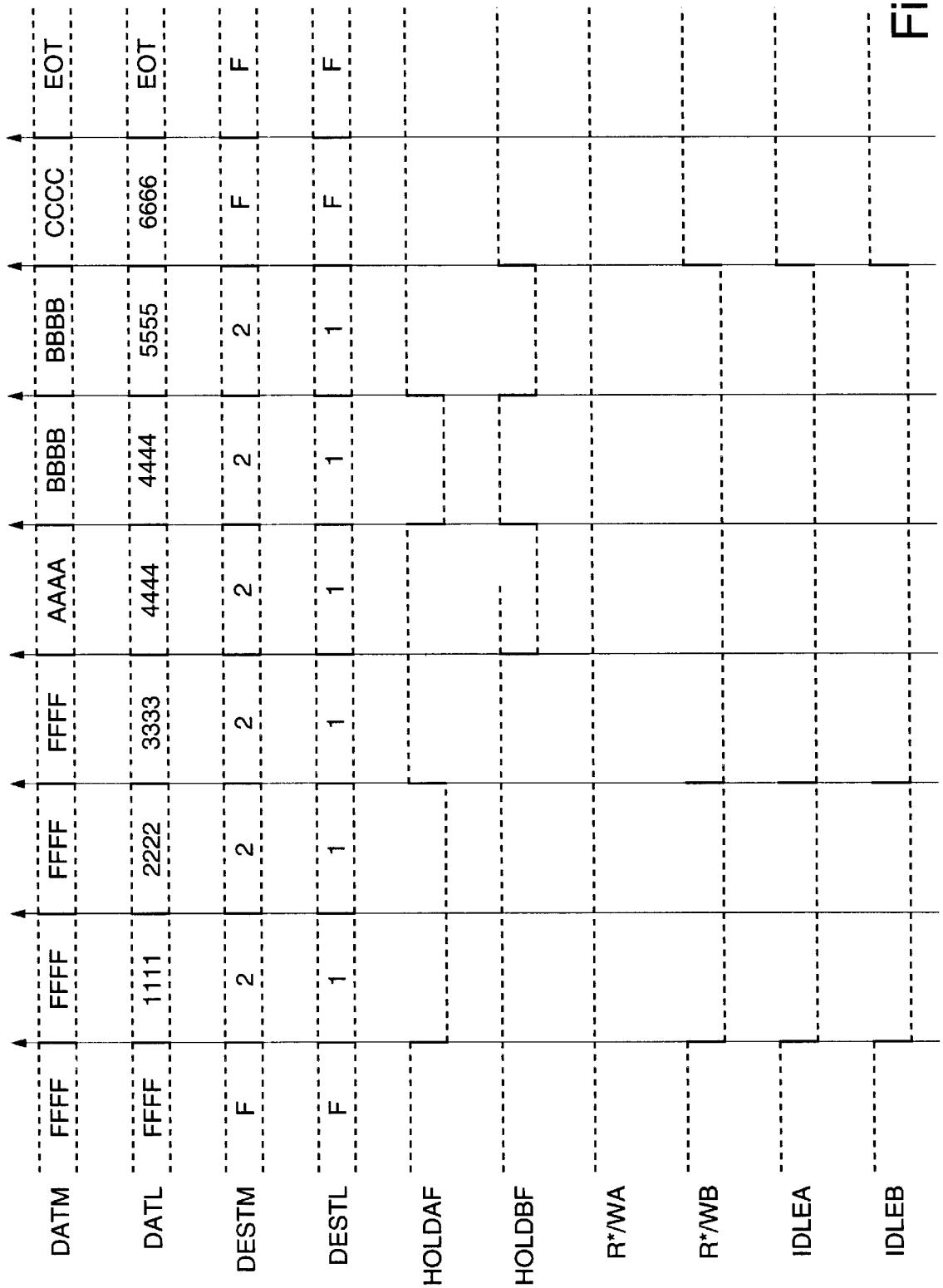
FIG. 7 is a timing diagram of a 32 bit multi-mode, multi-channel communication bus working in a dual 16 bit mode.

For the purposes of completeness, FIG. 7 is a timing diagram of a 32 bit multi-mode, multi-channel communication bus 20, such as the embodiment shown in FIG. 4, for example, working in a dual 16 bit mode. DATM and DATL signals represent the most and least significant 16 bits of the wider 32 bit bus 20. The 16 bit words "FFFF", "AAAA", "BBBB" and "CCCC" represent data packets, and are not represent any specific control or formatting information. The "EOT" is an end of transfer signal. The DESTM and DESTL signals are 4-bit code words (discrete destination indicators) that are sent to a slave 11. In this particular example, the bus structure depicts a 32 bit bus with two 16 bit slices. In this case the master 11 of the transmission would output the destination address as the 4-bit code to the slave 11. The numbers "F", "2" and "1" indicate slave 11 or destination terminals for reception of data. Each of these numbers identifies a unique slave 11 that is expected to receive the data. The HOLDx, R*/Wx and IDLEx signal groups are an example of signals at the physical protocol layer that facilitate MMIC characteristic requirements identified above. The IDLEx signals indicate to the arbiter 40 that the bus segment is IDLE and free to be reallocated for a requested transfer. The HOLDx signals provide transaction throttling in the event that the addressed slave 11 cannot take the data.

One of the most attractive characteristics of the multi-mode, multi-channel communication bus 20 is the severe reduction of bus arbitration latency that it provides. Simply put, latency is the time from when perspective bus masters 11 request the bus 20, to the time when the arbiter 40 gives the new bus masters 11 permission to drive (transfer data over) the bus 20. In the present implementation of the multi-mode, multi-channel inter-ASIC communication bus 20 that has been reduced to practice, there are four primary configurations (discussed previously), but in the most extreme case, 64 independent bus masters 11 may exist for a 64 bit large unified bus 20, each possessing a single (1) bit slice. This is equivalent to 64 independent serial busses, available upon demand if the communication bus 20 is designed to configure itself with bit wide granularity. With a 64 bit wide bus 20 that may be dynamically reconfigured to narrower copies of the wider unified bus 20 allowing quick grants to multiple masters 11, access time to bus services are virtually eliminated in most systems.

When using the multi-mode, multi-channel communication bus 20, the more bus masters 11 that consume the peak bandwidth, the less bandwidth is available to an individual bus master 11. In most cases however, the benefit of reducing latency is more desirable than a reduction in bandwidth because peak efficiency is realized for the entire ensemble of bus masters 11 or system.

The multi-mode, multi-channel communication bus 20 tends to optimize bus efficiency by increasing or completely eliminating the need for packetizing large data files into smaller packets, which require a large amount of overhead. A reduction in overhead stems from a reduction in arbitration cycles on the bus 20, and fewer header transfer cycles because of the reduction in the number of packets. Since most of the penalties incurred on conventional busses are attributed to the aforementioned causes, the efficiency (data transfer cycles versus total bus cycles) of the multi-mode, multi-channel communication bus 20 is higher than conventional busses having a comparable data width and peak data transfer rate.

Not only is latency drastically reduced (and in most cases, eliminated), several other advantages are realized that make the multi-mode, multi-channel communication bus 20 very conducive to simpler system designs. The present invention does not rely on the concept of packetizing to control latency, and complicated bus arbiters to guarantee extreme fairness, which simplifies the system design. Requirements placed upon the bus arbiter 40 are different because of the dynamic restructuring of the wider bus 20 into several smaller busses, thus servicing several bus masters 11 at once. This essentially eliminates the need for potentially complicated bus arbitration schemes, such as bus grants based upon fairness or priority. The dynamic bus reallocation operation performed in the multi-mode, multi-channel communication bus 20 permits the use of a very simple first come-first served arbiter 40, which is relatively easy to implement.

Since the multi-mode, multi-channel communication bus 20 may be modified to operate in smaller slices, there is a certain degree of redundancy. If a failure is detected on a bus driver of a particular bus master 11, the communication bus 20 may be reconfigured in a degraded resource mode. This feature makes the multi-mode, multi-channel communication bus 20 somewhat fault tolerant in that it may be reconfigured around the failure due to its inherent redundancy.

Thus, an improved multi-mode, multi-channel communication bus has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention. In particular, the disclosure of two, three or four bus slices as the segmented multiplexed bus is not to be taken as limiting, in that the multiplexed bus may be segmented into additional slices as a function of the number of nodes and the width of the unified bus.

What is claimed is:

1. A communication bus that permits communication between a plurality of nodes and which permits multiple nodes to drive the bus at the same time, said communication bus comprising:
   a bus interface disposed in each of the nodes, wherein said each of the nodes comprises
      (i) an input port comprising an input resister with a data input having a relatively wide data path,
      (ii) a barrel shift registered coupled to the input register,
      (iii) a shift register controller coupled to the barrel shift register for controlling the barrel shift register,
      (iv) a plurality of shift registers coupled to the barrel shift register so that each shift register of the plurality of shift registers has a data path that has a predetermined width that is less than the relatively wide data path,
      (v) a latch coupled to the plurality of shift registers,
      (vi) a latch controller coupled to the plurality of shift registers and the latch for controlling movement of addresses and data therethrough, and
      (vii) a data register coupled to the latch that comprises a data output having a data path with a predetermined width that is less than the relatively wide data path;
   a plurality of multiplexed busses coupled between the bus interfaces of said each of the nodes so that each bus of said plurality of multiplexed busses has a bus width that is a predetermined portion of the communication bus, and whose combined bus width is equal to the bus width of the communication bus;
   a plurality of control lines coupled between the bus interfaces of each of the nodes; and
   wherein one of the nodes includes an arbiter comprising logic that dynamically reconfigures the bus width of the communication bus to segment the communication bus into smaller independent slices and to allow multiple bus masters to control individual segments of the bus at the same time.

2. The communication bus of claim 1 wherein the plurality of nodes comprise a plurality of application specific integrated circuits.

3. The communication bus of claim 1 wherein the plurality of control lines further comprise a plurality of idle lines coupled between said each of the nodes.

4. A communication bus that permits communication between a plurality of nodes and which permits multiple nodes to drive the bus at the same time, said communication bus comprising:

a bus interface disposed in each of the nodes;

a plurality of multiplexed busses coupled between the bus interfaces of each of the nodes so that each bus of said plurality of multiplexed busses has a bus width that is a predetermined portion of the communication bus, and whose combined bus width is equal to the bus width of the communication bus;

a plurality of control lines coupled between the bus interfaces of each of the nodes;

wherein one of the nodes includes a arbiter comprising logic that dynamically reconfigures the bus width of the communication bus to segment the communication bus into smaller independent slices and to allow multiple bus masters to communication individual segments of the bus at the same time; and wherein the plurality of control lines comprises:
(i) a plurality of bus node lines coupled between the arbiter and each of the other nodes,
(ii) a plurality of bus request and grant lines coupled between each of the nodes, and
(iii) a plurality of read/write lines coupled between said each of the nodes.

5. The communication bus of claim 4 wherein the plurality of nodes comprise a plurality of application specific integrated circuits.

\* \* \* \* \*

UNITED STATES PATENT AND TRADEMARK OFFICE
CERTIFICATE OF CORRECTION

PATENT NO. : 5,936,953
DATED : August 10, 1999
INVENTOR(S) : Albert L. Simmons

It is certified that error appears in the above-identified patent and that said Letters Patent is hereby corrected as shown below:

<u>Column 1,</u>
Line 4, insert the following as the first paragraph after the heading BACKGROUND:

-- This invention was made with Government support under Contract Number F33657-91-C-00069 awarded by the Department of the Air Force. The Government has certain rights in this invention. --

Signed and Sealed this

Twenty-first Day of August, 2001

*Attest:*

*Attesting Officer*

NICHOLAS P. GODICI
*Acting Director of the United States Patent and Trademark Office*